United States Patent [19]

Lemcoff

[11] Patent Number: 5,520,720
[45] Date of Patent: May 28, 1996

[54] PRESSURE SWING ADSORPTION PROCESS

[75] Inventor: Norberto O. Lemcoff, Livingston, N.J.

[73] Assignee: The BOC Group, Inc., New Providence, N.J.

[21] Appl. No.: 346,796

[22] Filed: Nov. 30, 1994

[51] Int. Cl.⁶ ............................................. B01D 53/047
[52] U.S. Cl. ........................... 95/96; 95/101; 95/103; 95/105; 95/130; 95/138
[58] Field of Search ................ 95/96–98, 100–105, 95/130, 138

[56] References Cited

U.S. PATENT DOCUMENTS

| | | | |
|---|---|---|---|
| 3,338,030 | 8/1967 | Feldbauer, Jr. | 95/103 |
| 3,923,477 | 12/1975 | Armond et al. | 95/103 |
| 4,144,037 | 3/1979 | Armond et al. | 95/105 X |
| 4,348,213 | 9/1982 | Armond | 95/103 |
| 4,468,238 | 8/1984 | Matsui et al. | 95/102 |
| 4,737,167 | 4/1988 | Ohtani et al. | 95/102 |
| 4,756,723 | 7/1988 | Sircar | 95/103 |
| 4,781,735 | 11/1988 | Tagawa et al. | 95/101 |
| 4,840,647 | 6/1989 | Hay | 95/100 |
| 4,857,083 | 8/1989 | DiMartino | 95/101 X |
| 4,917,710 | 4/1990 | Haruna et al. | 95/102 |
| 4,925,461 | 5/1990 | Gemba et al. | 95/138 X |
| 5,002,591 | 3/1991 | Stanford | 95/98 |
| 5,051,115 | 9/1991 | Leitgeb et al. | 95/101 |
| 5,122,164 | 6/1992 | Hirooka et al. | 95/98 X |
| 5,137,549 | 8/1992 | Stanford et al. | 95/98 |
| 5,154,737 | 10/1992 | Jenkins et al. | 95/98 X |
| 5,176,722 | 1/1993 | Lemcoff et al. | 95/102 |
| 5,258,056 | 11/1993 | Shirley et al. | 95/97 X |
| 5,346,536 | 9/1994 | Kaneshige et al. | 95/103 |

*Primary Examiner*—Robert Spitzer
*Attorney, Agent, or Firm*—Coleman R. Reap; Larry R. Cassett

[57] ABSTRACT

The components of a gas mixture are separated by pressure swing adsorption in a plurality of adsorption vessels. In the first step of the half-cycle adsorption takes place in a first bed while the second bed undergoes countercurrent desorption. At the end of the first step the first bed is vented countercurrently and the first and second beds undergo, as a first bed equalization step, outlet-to-outlet equalization or outlet to both inlet and outlet equalization. The vent step may precede or be concurrent with the first bed equalization step. In a second equalization step the beds simultaneously undergo inlet-to-inlet and outlet-to-outlet equalization. The second bed is then further pressurized with nonadsorbed product gas. The half cycle is then repeated but with the first bed being substituted for the second bed and vice versa.

16 Claims, 3 Drawing Sheets

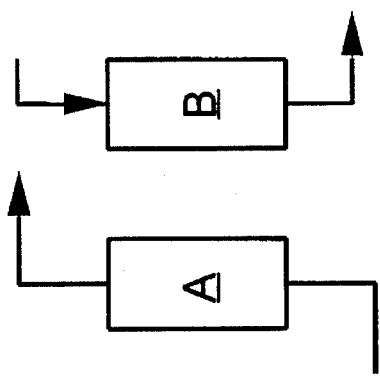
FIG. 2A
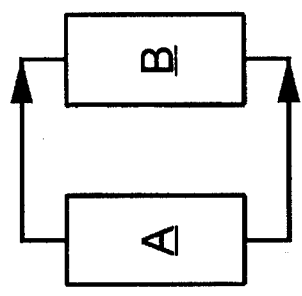
FIG. 2B
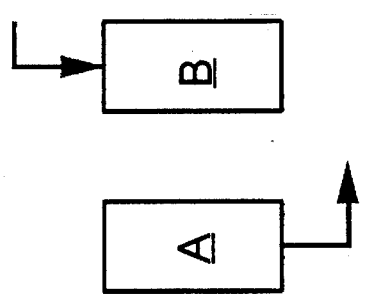
FIG. 2C
FIG. 2D
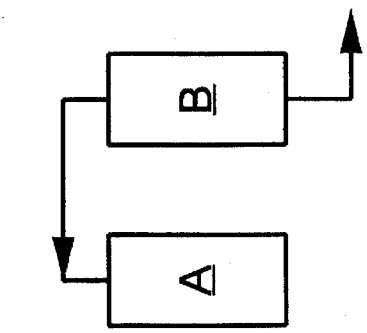
FIG. 2E
FIG. 2F
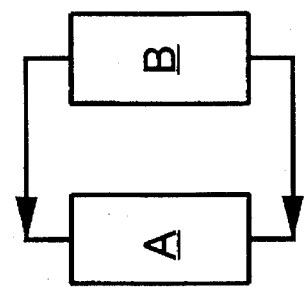
FIG. 2G
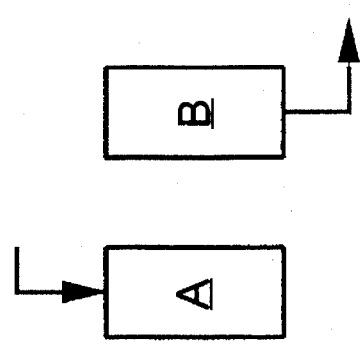
FIG. 2H

PRESSURE SWING ADSORPTION PROCESS

FIELD OF THE INVENTION

This invention relates to a method of separating gases, and more particularly to the separation of one or more gaseous components of a gas mixture by pressure swing adsorption.

BACKGROUND OF THE INVENTION

The process of separating the components of a gas mixture by pressure swing adsorption (PSA) comprises, in general, a series of steps including the basic steps of adsorption and bed regeneration. The PSA process is generally carried out in an elongated vessel having an inlet and an outlet at opposite ends of the vessel, and containing a layer of adsorbent which adsorbs one or more of the components of the gas mixture more strongly than it adsorbs one or more other components of the mixture. During the adsorption step the gas mixture is introduced into the vessel through the vessel inlet and is passed through the vessel at elevated pressure, whereupon a fraction of the gas mixture enriched in the more strongly adsorbed component(s) is adsorbed by the adsorbent, while another fraction, enriched in the less strongly adsorbed component(s), passes through the vessel and is discharged from the vessel through the outlet as nonadsorbed product gas. As the adsorption step proceeds, adsorption fronts delineating the forward end of each component of the adsorbed fraction form and advance toward the outlet end of the vessel. The adsorption step is terminated before the most advanced adsorption front reaches the outlet end to prevent adulteration of the nonadsorbed product gas with more strongly adsorbed component(s). Subsequently, the adsorbent in the vessel is regenerated by permitting the vessel to depressurize by releasing gas from the vessel, generally through its inlet. The desorbed gas fraction may be recovered or disposed of, as desired. The adsorption and desorption steps are desirably repeatedly performed in cyclical fashion so that the process is substantially continuous.

A number of improvements have been made to enhance the performance of the above-described two-step process, which, by itself, is highly inefficient and results in the production of low volume, low purity product. Thus, the process is generally carried out commercially in a battery of adsorption vessels arranged in parallel and operated out of phase with one another to approximate a continuous process. In a particularly useful embodiment of a multiple bed system, a pair of adsorption vessels are arranged in parallel and operated 180 degrees out of phase with one another, such that one vessel is in adsorption service while the adsorbent in another is undergoing regeneration. The pressure in the vessel during the adsorption step (adsorption pressure) is usually atmospheric or above, for example, in the range of about 1 to about 20 bar, absolute, while that in the vessel undergoing bed regeneration is reduced to a value somewhat below the adsorption pressure.

An improvement which markedly improves the efficiency of a two bed system is the transfer of void space gas, i.e. the gas contained in the interstices between the particles of adsorbent, from the vessel which has just completed the adsorption step to the vessel which has just completed the bed regeneration step. This step is usually referred to herein as "equalization", since the pressure in the bed being depressurized and that in the vessel being repressurized tend to approach a common value. In practice however, the equalization step is not carried out to actual pressure equalization, since this could cause desorption of the adsorbed component in the bed being depressurized and transfer of this component to the vessel undergoing repressurization.

Bed equalization between a pair of parallel-operated adsorption beds can be carried out in a number of ways. In one procedure, fluid communication between the outlets of the two beds is established, and void space gas flows from the outlet end of one vessel to the outlet end of the other (outlet-to-outlet equalization). In another procedure, the inlets of the two beds are connected, permitting void space gas to flow from the inlet end of one vessel to the inlet end of the other vessel (inlet-to-inlet equalization). In a third procedure, the outlet of the vessel undergoing depressurization is connected to the inlet of the vessel undergoing repressurization (outlet-to-inlet equalization). Combinations of these procedures are also practiced. A highly efficient bed equalization procedure is simultaneous outlet-to-outlet and inlet-to-inlet equalization. This procedure has the advantages of minimal disturbance of the beds, rapid gas transfer and ensuring that the highest purity void space gas in the first bed is transferred to the outlet end of the second bed, which minimizes adulteration of the nonadsorbed product gas from the second bed when it goes into adsorption service. These procedures are discussed in more detail in U.S. Pat. No. 4,925,461.

U.S. Pat. No. 5,346,536 discloses a PSA process for separating nitrogen from oxygen that is carried out in two or more parallel-arranged adsorption vessels and whose cycle includes a step in which a portion of the gas being transferred from one vessel to another during bed equalization is vented from the system.

It is very difficult or impossible to attain perfect separation of the components of a gas mixture by PSA. However, because even small enhancements of product yield and/or product purity can have a considerable impact on the overall efficiency of a PSA process, improvements which will enhance the yield and purity of the product gases from PSA processes are constantly sought. The present invention provides a novel cycle which enhances the purity of the nonadsorbed gas stream produced by a PSA system.

SUMMARY OF THE INVENTION

The process of the invention employs a novel pressure swing adsorption cycle carried out in a battery of two or more adsorption beds arranged in parallel and operated out of phase, such that one or more beds are in adsorption service while one or more other beds are undergoing other stages of the cycle, such as bed regeneration.

According to a first preferred embodiment of the invention, the pressure swing adsorption process is carried out in repeating half-cycles in a pair of parallel-arranged adsorption beds operated 180° out of phase, such that one bed is in adsorption service while the second bed is undergoing regeneration. In the broadest aspect of this embodiment, the first step of a half-cycle of the process comprises passing the gas mixture to be separated (feed gas), at a selected superatmospheric pressure, through a first bed of adsorbent which more strongly adsorbs at least one of the components of the mixture. The more strongly adsorbed component(s) is adsorbed while the less strongly adsorbed component(s) passes through the bed and is discharged therefrom as nonadsorbed product gas. Meanwhile, the second bed is undergoing bed regeneration by countercurrent depressurization. Bed regeneration is carried out by countercurrently depressurizing the bed to atmospheric pressure, or, if desired, to subatmospheric pressure using a vacuum means. The bed undergoing regeneration is preferably countercurrently purged with nonadsorbed product gas during the regeneration step.

Upon completion of the first step, the flow of feed gas into the first bed is terminated and a portion of the gas contained in the first bed is countercurrently vented from the bed, and another portion is transferred from the first bed to the second bed through the outlet ends of the beds in a first bed equalization step, which partially pressurizes the second bed. The countercurrent vent of the first bed may precede the first bed equalization step; or it may begin simultaneously with, and end before completion of, the first equalization step, or it may continue for the full extent of this equalization step. During the first equalization step no gas is transferred from the first bed to the second bed through the bed inlets.

After the first equalization step is completed a second bed equalization step is carried out during which void space gas is transferred from the first bed to the second bed simultaneously through the bed outlets (top-to-top) and bed inlets (bottom-to-bottom). During this second equalization step no gas is vented from the first bed.

At the conclusion of bed equalization, the second bed is pressurized to the selected superatmospheric pressure by flowing feed gas cocurrently into the bed, if no further steps are included in the half cycle. The first half-cycle of the process is complete when the second bed reaches adsorption operating pressure. The second bed is now ready to begin the adsorption step, and the first bed is ready for the bed regeneration step.

The second phase of the cycle is carried out by repeating the above steps with the second bed taking the place of the first bed and the first bed taking the place of the second bed in the described half-cycle. The cycle is repeated to effect a substantially continuous process.

In a second preferred embodiment of the invention, the first half of the process cycle is the same as the first half-cycle in the first preferred embodiment except that the first equalization step comprises transferring void space gas out of the first bed through the first vessel outlet and into the second bed simultaneously through both the inlet and the outlet of the second vessel; and the second half of the cycle is the same as the second half-cycle in the first preferred embodiment except that the first equalization step comprises transferring void space gas out of the second bed through the second vessel outlet and into the first bed simultaneously through both the inlet and the outlet of the first vessel. In this second embodiment of the process of the invention, the countercurrent vent step may precede or start simultaneously with the first equalization step.

In a variation of the above-described broad embodiments of the invention, the bed being repressurized is further pressurized with nonadsorbed product gas following bed equalization, to bring its pressure closer to the selected superatmospheric pressure at which the adsorption step is carried out. This may be accomplished by flowing nonadsorbed product gas countercurrently into the bed until the desired pressure is attained.

In the most preferred procedure of the above-described embodiment, bed pressurization is accomplished by including in the half cycle a first equalization step in which either the outlet ends of the two beds are connected, or the outlet end of the first bed is connected to both the outlet end and the inlet end of the second bed; a second equalization step in which the outlet ends of the two beds are connected and the inlet ends of the two beds are connected; a product backfill step in which nonadsorbed gas is countercurrently flowed into the bed being pressurized; and a feed gas pressurization step in which the pressure in the bed being pressurized is brought up to the above-mentioned selected superatmospheric pressure by flowing feed gas cocurrently into the bed.

The pressure during the adsorption step of the process of the invention is superatmospheric, and is generally in the range of above about 1 bar, absolute, to about 20 bar, absolute, and it is preferably in the range of about 4 to about 14 bar, absolute. The adsorption process is typically carried out at a temperature in the range of about −50° to about 100° C., and is usually carried out at a temperature in the range of about 0° to about 50° C.

BRIEF DESCRIPTION OF THE DRAWINGS

FIGS. 2a to 2h illustrate the steps of a first preferred embodiment of the invention as carried out in a two-bed adsorption system.

DETAILED DESCRIPTION OF THE INVENTION

Figure 1:
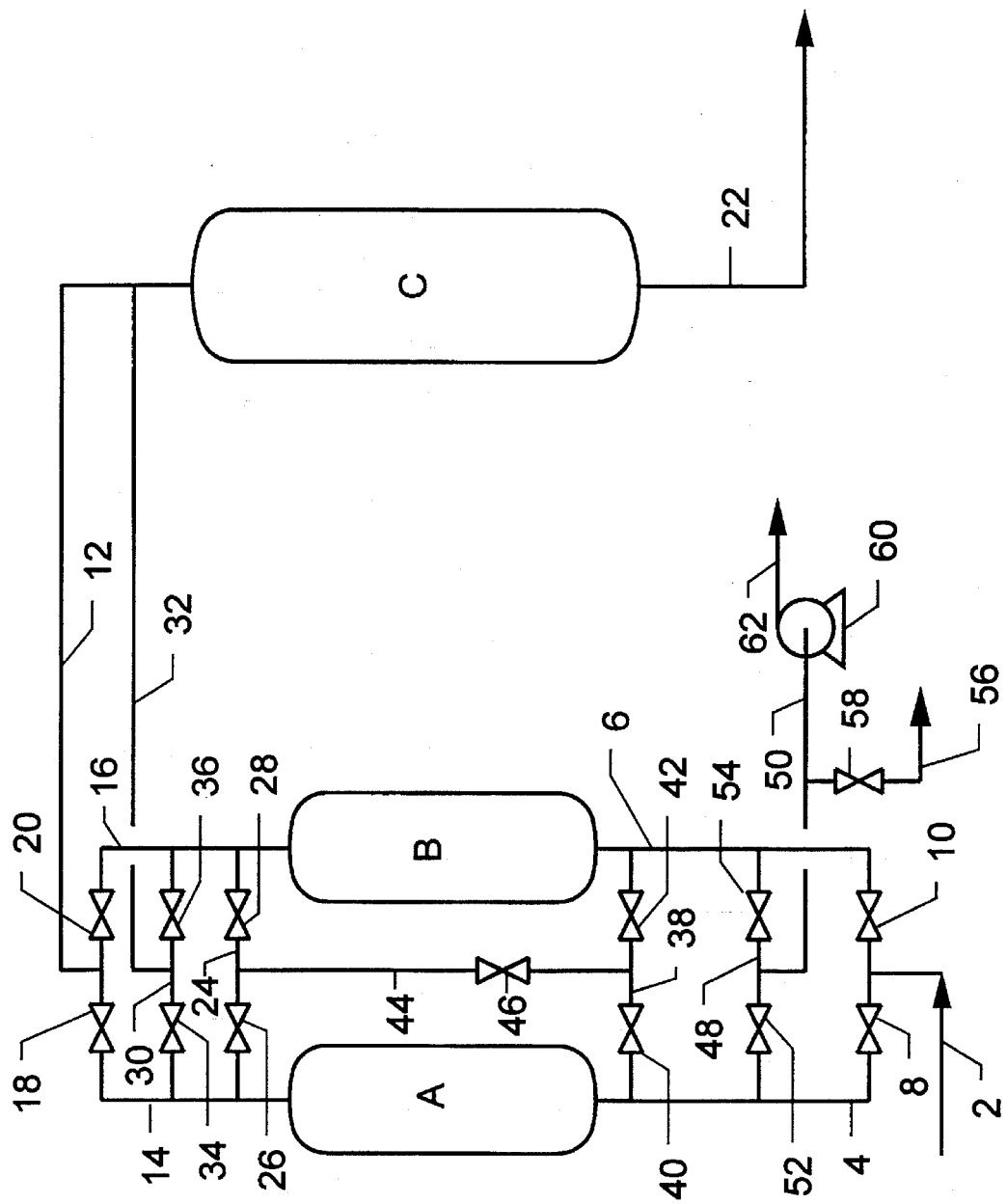
FIG. 1 is a schematic illustration of a two-adsorber plant equipped for practice of the preferred embodiments of the invention.

The invention is a new and improved pressure swing adsorption cycle for separating two or more components of a gas mixture. The process is carried out in two or more adsorption vessels operated in parallel, and provides the advantage over conventional adsorption cycles of making it possible to produce a nonadsorbed product gas of higher purity. The cycle is particularly well adapted for practice in a two bed system operated 180 degrees out of phase. The cycle includes a step in which one bed is in production, i.e. adsorption, while the second bed is being regenerated; a countercurrent vent step; at least two bed-to-bed pressure equalization steps; and a bed repressurization step. The novel cycle of the invention includes a countercurrent vent step following the adsorption step, which enables practitioners to produce higher purity nonadsorbed product gas than can be obtained with conventional cycles, because a portion of the least pure gas contained in the adsorption vessel at the end of the adsorption cycle, i.e. gas whose composition is not very different from that of the feed gas, is removed from the adsorption system.

The countercurrent vent step is preferably carried out at a time when the feed end of the adsorption vessel which has just completed its cycle contains the most impure gas composition (with respect to the nonadsorbed product gas purity). In this regard, the vent step is carried out before the gas in the inlet end of the adsorption vessel undergoes substantial change in composition or is transferred to the second adsorption vessel. Thus, it can be carried out immediately after completion of the adsorption step, i.e. before any bed equalization step takes place, or it can be conducted in a manner such that it at least partially overlaps the first bed equalization step of the half-cycle of the invention. Additionally, the duration of the vent step may be shorter, longer or equal to the duration of the first bed equalization step. The results obtained from each of the alternatives will vary since the bed pressure decreases as the vent step and the bed equalization step proceeds. In the preferred embodiment, the vent step and the first bed equalization step start simultaneously and the vent step is shorter than or equal to the first equalization step.

The process of the invention can be applied to the separation of any gas mixture. It is particularly useful for the separation of nitrogen from oxygen in a gas mixture such as air, using an adsorbent which more strongly adsorbs nitrogen than oxygen, or using an adsorbent which more strongly adsorbs oxygen than nitrogen.

The adsorbent used in the process of the invention may be any adsorbent which more strongly adsorbs the component that it is desired to adsorb than the one or more other components of the gas mixture that it is desired to not adsorb. Typical of the adsorbents useful in the invention include silica gel, activated alumina, activated carbon, molecular sieves, such as carbon molecular sieve (CMS), and natural and synthetic zeolites. Natural zeolites include mordenite, faujasite, erionite, clinoptilolite, chabazite, etc., and synthetic zeolites include type A zeolites, such as zeolites 3A, 4A, 5A, etc., type X zeolites such as zeolites 10X, 13X, etc., and type Y zeolites. The particular adsorbent used in the process of the invention will depend upon the components of the gas mixture that it is desired to separate, and the selection of the adsorbent forms no part of the invention. When it is desired to adsorb oxygen from an oxygen-nitrogen gas mixture, such as air, it is preferred to use CMS or zeolite 4A as the adsorbent, and when it is desired to adsorb nitrogen from the same or a similar mixture, it is preferred to use zeolites 5A, 10X or 13X as the adsorbent. To simplify the discussion, the invention will be described in detail as it applies to the adsorption of oxygen from air using CMS as the adsorbent. This adsorption is conducted under kinetic adsorption conditions, and the effectiveness of the process depends upon the difference in the rates of adsorption of the various components of the gas being treated. Since oxygen is adsorbed much more rapidly than nitrogen by CMS, the short duration of the adsorption step makes it possible to selectively adsorb oxygen from an oxygen-nitrogen gas mixture.

The invention is further illustrated in the attached drawings. Various flow lines have been included in the figures as an aid to the explanation of the several aspects of the invention. Associated processing equipment, valves, gages, etc. that are not directly related to the invention and which are not necessary for an understanding of the invention have been omitted from the figures for the sake of simplicity. The same reference numerals have been used to represent the same or similar parts in the various drawings.

Turning now to the embodiment illustrated in FIG. 1, there is illustrated therein an adsorption system adapted to handle each of the above-discussed embodiments of the invention. The major vessels illustrated in FIG. 1 are parallel adsorption vessels A and B and nitrogen-enriched gas buffer vessel C. For purposes of this description vessels A and B are filled with CMS. The adsorption system is provided with air feed line 2, which is connected to the inlet end of adsorber A through line 4 and to the inlet end of adsorber B through line 6. Gas flow from line 2 to adsorbers A and B is controlled by valves 8 and 10, respectively. On their nonadsorbed product gas outlet ends adsorption vessels A and B are connected to nitrogen product line 12 through nonadsorbed product gas discharge lines 14 and 16, respectively. Flow through lines 14 and 16 to line 12 is controlled by valves 18 and 20, respectively. Line 12, on its downstream end, is joined to vessel C. Line 22 connects buffer vessel C to downstream storage or an end application. Outlet end equalization cross-connection line 24 connects lines 14 and 16. Flow through line 24 is controlled by valves 26 and 28. Backfill/purge cross-connection line 30 joins lines 14 and 16 to backfill/purge line 32, which, in turn, is joined to the inlet end of vessel C. Valves 34 and 36 control flow through line 30 to vessels A and B, respectively. Inlet end equalization cross-connection line 38 connects lines 4 and 6. Valves 40 and 42 control flow through line 38. Outlet-to-inlet equalization line 44 at its upper end is connected to line 24 at a point between valves 26 and 28, and at its lower end to line 38 at a point between valves 40 and 42. Flow through line 44 is controlled by valve 46. Vent cross-connection line 48 connects lines 4 and 6 to vent line 50. Valves 52 and 54 control flow from line 4 to line 50 and from line 6 to line 50, respectively. Line 50 is connected to atmospheric vent line 56 and the inlet to vacuum pump 60. Valve 58 controls flow through line 56. Line 62 discharges exhaust gas from vacuum pump 60 to the atmosphere.

FIG. 2 illustrates the various steps in the first preferred embodiment described above, i.e. the embodiment in which the bed equalization procedure comprises a first equalization step in which vessels A and B are equalized outlet-to-outlet and a second equalization step in which the two vessels are equalized inlet-to-inlet and outlet-to-outlet.

The first preferred embodiment will be described beginning with the first step of the half cycle, in which the adsorption bed in vessel A is in adsorption service and the bed in vessel B is undergoing regeneration. This step is illustrated in FIG. 2A. Valves 8, 18, 36 (when a purge step is included in the cycle), and 54 are open during the entire step, valve 58 is open for a first part of this step and all other valves remain closed during the entire step. Air, compressed to the desired adsorption pressure by means of a compressor (not shown) enters vessel A through lines 2 and 4. As the air passes through vessel A, oxygen is adsorbed by the CMS and nitrogen passes through the bed. A nitrogen-enriched nonadsorbed product stream exits vessel A through line 14 and passes through line 12 to buffer vessel C. During this period oxygen-rich gas that was adsorbed by the bed of CMS in vessel B is desorbed from the CMS and evacuated countercurrently through line 6. Vessel B is preferably first depressurized to about atmospheric pressure by permitting it to vent to the atmosphere through line 56 and then further evacuated by closing valve 58 and activating vacuum pump 60. The desorbed oxygen-rich gas stream is drawn through lines 6, 48 and 50 by vacuum pump 60, and is discharged to the atmosphere through line 62. During the evacuation of vessel B, this vessel is preferably purged by passing low pressure nitrogen-enriched gas therethrough via lines 32, 30 and 16.

After vessel B is evacuated and the adsorption front in vessel A reaches the desired point, the adsorption step is terminated and the first vent and first equalization steps, illustrated in FIG. 2B, are begun. This vent step is referred to as the "first vent" since the described cycle includes a second atmospheric vent step just prior to vacuum pump evacuation of the adsorption vessels. For this step, valves 8, 18, 36, and 54 are closed and valves 26, 28, 52 and 58 are opened. Gas contained near the nonadsorbed product gas outlet of vessel A is transferred to vessel B through lines 14, 24 and 16, thereby partially pressurizing vessel B; and gas contained in the inlet section of vessel A is vented to the atmosphere through lines 4, 48, 50, and 56. As noted above the duration of the vent step may be shorter or longer than, or equal to the duration of the first equalization step.

Upon completion of the first equalization step, valves 52 and 58 are closed and valves 40 and 42 are opened and the second equalization step is carried out. During this step, illustrated in FIG. 2C, additional gas contained in the nonadsorbed product outlet end of vessel A is transferred to vessel B via lines 14, 24 and 16, and gas is transferred from the inlet end of vessel A to the inlet end of vessel B via lines 4, 38 and 6, thereby further pressurizing vessel B.

When the desired quantity of gas is transferred from vessel A to vessel B, valves 26, 28, 40 and 42 are closed and the nonadsorbed product backfill step is started. This is effected by opening valve 36 and permitting nitrogen-enriched gas to flow at product pressure into vessel B via lines 32, 30 and 16, thereby further increasing the pressure in this vessel. At the same time, valves 52 and 58 are opened and vessel A is permitted to vent substantially to atmospheric pressure through lines 4, 48, 50 and 56. This step, illustrated in FIG. 2D, completes the first half cycle of the process.

The second half-cycle of the process includes all of the above steps, except that vessel B undergoes adsorption and depressurization and vessel A is regenerated and repressurized. In the first step of the second half-cycle, illustrated in FIG. 2E, valves 10, 20, 34 and 52 are open during the entire step, valve 58 is open for a first part of the step, and all other valves are closed during the entire step. Air at superatmospheric pressure flows into vessel B while nitrogen-enriched product gas flows from vessel B to vessel C, and vessel A is evacuated, preferably with purging, in the manner described above.

Upon completion of the first step, the first vent/equalization step, illustrated in FIG. 2F, takes place, during which valves 26, 28, 54 and 58 are open, and all other valves are closed. Void space gas from the top of vessel B flows to vessel A through lines 16, 24 and 14, while void space gas is vented from the inlet end of vessel B to the atmosphere through lines 6, 48, 50 and 56.

Next, the second equalization step of the second half-cycle, illustrated in FIG. 2G, takes place. During this step, only valves 26, 28, 40 and 42 are open, and equalization gas flows from the top of vessel B to the top of vessel A through lines 16, 24 and 14; and from the bottom of vessel B to the bottom of vessel A through lines 6, 38 and 4.

When the desired quantity of equalization gas flows from vessel B to vessel A, the second equalization step is terminated and the last step of the second half-cycle is carried out, during which vessel A is further pressurized with nitrogen-enriched gas at nonadsorbed product gas storage pressure and vessel B is vented substantially to atmospheric pressure. This is effected by closing valves 26, 28, 40 and 42 and opening valves 34, 54 and 58. This step is illustrated in FIG. 2H.

Figure 3D:
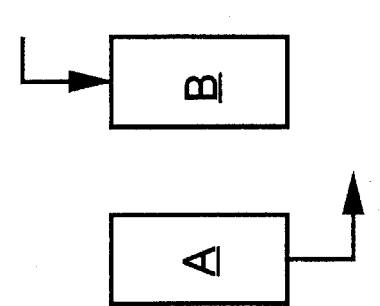
FIGS. 3a to 3h illustrate the steps of a second preferred embodiment of the invention as carried out in a two-bed adsorption system.
Figure 3C:
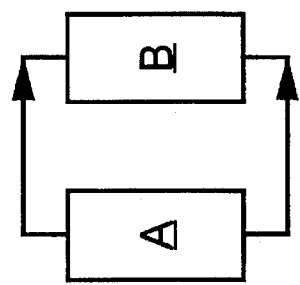
Figure 3B:
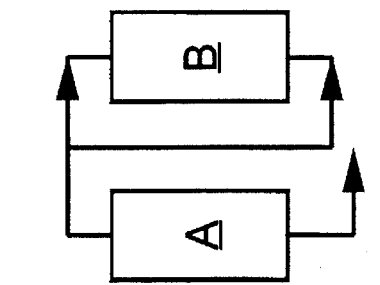
Figure 3A:
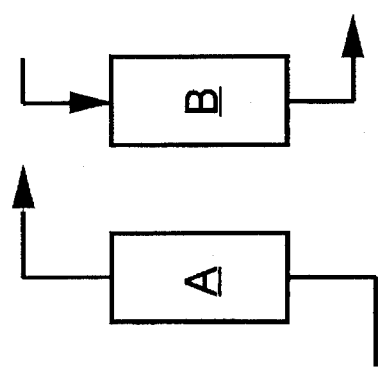
Figure 3H:
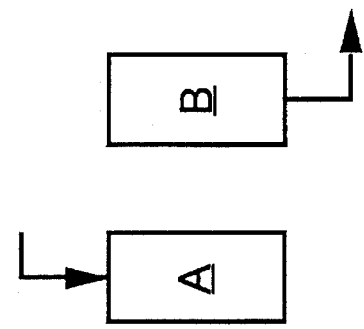
Figure 3G:
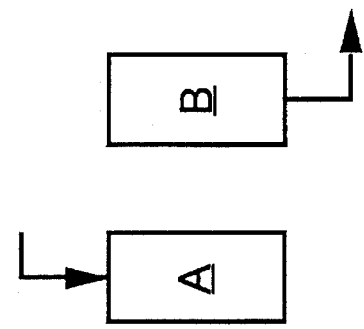
Figure 3F:
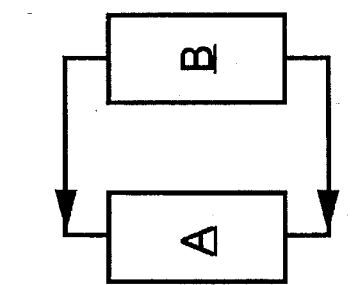
Figure 3E:
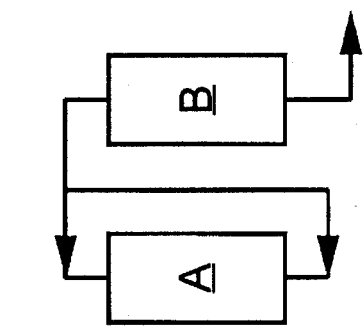

The second preferred embodiment described above is illustrated in FIGS. 3A through 3H. In this embodiment, the steps shown in FIGS. 3A, 3C, 3D, 3E, 3G and 3H are identical to the steps shown in FIGS. 2A, 2C, 2D, 2E, 2G and 2H, respectively. The only difference in the processes of the two embodiments appears in the steps illustrated in FIGS. 3B and 3F, i.e. the first equalization steps of the cycle.

During the first equalization of the first half-cycle of this embodiment, void space gas is transferred from the outlet end of vessel A to both the inlet end and the outlet end of vessel B. This is accomplished by opening valves 26, 28, 42 and 46. Meanwhile a part of the void space gas in the lower part of vessel A is permitted to vent to the atmosphere by opening valves 52 and 58 for the desired period of time. All other valves remain closed during this step. During the first equalization of the second half-cycle of this embodiment, void space gas is caused to flow from the outlet end of vessel B to both the inlet end and the outlet end of vessel A by opening valves 26, 28, 40 and 46; and a part of the void space gas in the lower part of vessel B is permitted to vent to the atmosphere by opening valves 54 and 58, all other valves remaining closed.

As a variation of the second preferred embodiment, the first equalization steps may be carried out in two stages, with valve 46 being closed during the first stage and open during the second stage. During the second stage the valve connecting the outlet of the vessel being depressurized to the outlet of the vessel being repressurized can, if desired, be closed. This permits the most pure gas to flow from the vessel being depressurized to the outlet end of the vessel being repressurized. The advantage of this variation is that the purest gas flows to the top of the vessel being repressurized, and then somewhat less pure flow gas flows to the bottom of the receiving vessel. In any event, the second equalization step, in which both outlet-to-outlet and inlet-to-inlet equalization occurs, follows the first equalization step.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE

This example consists of four experimental runs, each having a total half-cycle time of 120 seconds and each conducted for a period of time sufficient to ensure steady state conditions. The experimental runs were carried out in a pair of vertical parallel-arranged cylindrical adsorption vessels 76 cm in diameter and approximately 2.1 meters high. Each vessel was packed with approximately 530 liters of commercial grade carbon molecular sieve pellets having a diameter of about 2 mm. The adsorption vessels were equipped with lines and valving sufficient to conduct experiments in accordance with the preferred embodiments of the invention. The beds were operated 180° out of phase with one vessel in adsorption service while the other vessel underwent bed regeneration. All venting of the beds was through the feed gas inlets of the vessels. The feed gas was air, compressed to a pressure of about 8.4 bar. During bed regeneration pressure in the vessel undergoing bed regeneration was reduced to about 1 bar by venting the bed to the atmosphere. The adsorption processes were carried out at a temperature of about 18° C. Runs 1 and 2 were conducted in accordance with the process of the invention and Runs 3 and 4 were comparative runs. During the regeneration step of each half-cycle the bed being regenerated was countercurrently purged with low pressure nonadsorbed product gas.

Each half-cycle of Run 1 comprised a 115 second feed pressurization and adsorption/bed regeneration step, a 1 sec. vent/equalization step with the beds being equalized by outlet-to-outlet connection and the bed undergoing depressurization being vented to the atmosphere, a 2 sec. inlet-to-inlet and outlet-to-outlet equalization step, and a 2 sec. countercurrent nonadsorbed product backfill step.

Each half-cycle of Run 2 comprised a 115 sec. feed pressurization and adsorption/bed regeneration step, a 1 sec. vent/equalization step with the beds being equalized by flowing gas from the outlet end of the bed being depressurized to both the inlet and the outlet ends of the bed being repressurized, a 2 sec. inlet-to-inlet and outlet-to-outlet equalization step and a 2 sec. countercurrent nonadsorbed product backfill step.

Each half-cycle of Run 3 comprised a 116 sec. feed pressurization and adsorption/bed regeneration step, a 2 sec. vent/equalization step with the beds being equalized by inlet-to-inlet equalization, and a 2 sec. countercurrent nonadsorbed product backfill step.

Each half-cycle of Run 4 comprised a 116 sec. feed pressurization and adsorption/bed regeneration step, a 2 sec. vent/equalization step with the beds being equalized by both inlet-to-inlet and outlet-to-outlet connection, and a 2 sec. countercurrent nonadsorbed product backfill step.

The results of the above-described four runs are tabulated in the Table.

TABLE

| Run | $N_2$ Yield, % | $O_2$ Impurity Level, ppm |
|---|---|---|
| 1 | 18.5 | 67 |
| 2 | 18.6 | 63 |
| 3 | 17.2 | 119 |
| 4 | 18.0 | 72 |

Inspection of the results tabulated in the Table show that the runs conducted in accordance with the preferred embodiments (Runs 1 and 2) produce better results than those obtained in the comparative runs. Runs 1 and 2 have better nonadsorbed product yields than either of the comparative runs. Furthermore, the impurity level of the best comparative run, Run 4, is 7% higher than that of Run 1 and 14% higher than that of Run 2.

Although the invention has been described with particular reference to specific equipment arrangements, to specific adsorption cycles, and to specific experiments, these features are merely exemplary of the invention and variations are contemplated. For example, the adsorption cycle may include more than two bed equalization steps, and the purge step and/or the nonadsorbed product backfill step may be included or eliminated, as desired. Furthermore, the duration of the individual steps and the operating conditions may be varied. The scope of the invention is limited only by the breadth of the appended claims.

What is claimed is:

1. A continuous process for separating a first component of a gas mixture from a second component of said gas mixture by pressure swing adsorption in a system comprising first and second vessels each containing a bed of adsorbent that more strongly adsorbs said first component than said second component and each having an inlet end and an outlet end, comprising as a first half-cycle conducting the steps:

(a) flowing said gas mixture at a selected superatmospheric pressure cocurrently through said first vessel, thereby adsorbing a fraction enriched in said first component and discharging a gas product enriched in said second component from said first vessel through its outlet end, while desorbing first component-enriched fraction from said second vessel by countercurrently depressurizing said second vessel;

(b) terminating the flow of said gas mixture into said first vessel;

(c) countercurrently venting partially fractionated gas mixture from said first vessel;

(d) partly pressurizing said second vessel by flowing partially fractionated gas mixture from the outlet end of said first vessel into the outlet end of said second vessel;

(e) further pressurizing said second vessel by flowing partially fractionated gas mixture simultaneously from the outlet end of said first vessel into the outlet end of said second vessel and from the inlet end of said first vessel into the inlet end of said second vessel;

(f) pressurizing said second vessel to said selected superatmospheric pressure by cocurrently flowing said gas mixture thereinto;

and as a second half-cycle repeating steps (a) to (f), but with the roles of said first and second vessels reversed.

2. The process of claim 1, further comprising flowing partially fractionated gas from the outlet end of said first vessel into the inlet end of said second vessel during step (d).

3. The process of claim 1, further comprising flowing partially fractionated gas from the outlet end of said first vessel into the inlet end of said second vessel between steps (d) and (e).

4. The process of either claim 1 or claim 2, further comprising between steps (d) and (f), further pressurizing said second vessel by flowing gas product enriched in said second component countercurrently thereinto.

5. The process of claim 1 or claim 2, wherein step (c) at least partially precedes step (d).

6. The process of claim 1 or claim 2, wherein step (c) and step (d) at least partially overlap.

7. A continuous process for separating a first component of a gas mixture from a second component of said gas mixture by pressure swing adsorption in a system comprising first and second vessels each containing a bed of adsorbent that more strongly adsorbs said first component than said second component and each having an inlet end and an outlet end, comprising as a first half-cycle conducting the steps:

(a) flowing said gas mixture at a selected superatmospheric pressure cocurrently through said first vessel, thereby adsorbing a fraction enriched in said first component and discharging a gas product enriched in said second component from said first vessel through its outlet end, while desorbing first component-enriched fraction from said second vessel by countercurrently depressurizing said second vessel;

(b) terminating the flow of said gas mixture into said first vessel;

(c) countercurrently venting partially fractionated gas mixture from said first vessel;

(d) partly pressurizing said second vessel by flowing partially fractionated gas mixture from the outlet end of said first vessel into both the inlet end and the outlet end of said second vessel;

(e) further pressurizing said second vessel by flowing partially fractionated gas mixture simultaneously from the outlet end of said first vessel into the outlet end of said second vessel and from the inlet end of said first vessel into the inlet end of said second vessel;

(f) further pressurizing said second vessel by flowing second component-enriched gas product countercurrently thereinto;

(g) pressurizing said second vessel to said selected superatmospheric pressure by cocurrently flowing said gas mixture thereinto;

and as a second half-cycle repeating steps (a) to (g), but with the roles of said first and second vessels reversed.

8. The process of any one of claims 1, 2 or 7, wherein said selected superatmospheric pressure is in the range of above 1 bar absolute to about 20 bar absolute.

9. The process of claim 8, wherein step (a) is carried out at a temperature in the range of about −50° to about 100° C.

10. The process of any one of claims 1, 2 or 7, wherein during step (a) the pressure in said second vessel is reduced to an absolute pressure in the range of about 100 to about 5000 torr.

11. The process of any one of claims 1, 2 or 7, wherein said gas is air.

12. The process of claim 11, wherein said selected superatmospheric pressure is in the range of about 4 to about 14 bar.

13. The process of claim 11, wherein step (a) is carried out at a temperature in the range of about 0° to about 50° C.

14. The process of claim 11, wherein during step (a) the pressure in said second vessel is reduced to an absolute pressure in the range of about 200 to about 2000 torr.

15. The process of claim 11, wherein said first component is oxygen and said second component is nitrogen.

16. The process of claim 11, wherein said first component is nitrogen and said second component is oxygen.

* * * * *